US010467533B2

(12) United States Patent
Kumar et al.

(10) Patent No.: US 10,467,533 B2
(45) Date of Patent: Nov. 5, 2019

(54) SYSTEM AND METHOD FOR PREDICTING RESPONSE TIME OF AN ENTERPRISE SYSTEM

(71) Applicant: Tata Consultancy Services Limited, Mumbai (IN)

(72) Inventors: Kriti Kumar, Whitefiled (IN); Naveen Kumar Thokala, Whitefiled (IN); Ravikumar Karumanchi, Whitefiled (IN); Mariswamy Girish Chandra, Whitefiled (IN); Kalyan Prathap Kamakolanu Guru, Bangalore (IN); Suresh Upparapalli, Bangalore (IN); Madhusudhan Kamma Chavala Chowdary, Hyderabad (IN); Prasanna Madhavrao Kulkarni, Bangalore (IN); Pareshkumar Bhawanishankar Sharda, Houston, TX (US)

(73) Assignee: Tata Consultancy Services Limited, Mumbai (IN)

( * ) Notice: Subject to any disclaimer, the term of this patent is extended or adjusted under 35 U.S.C. 154(b) by 520 days.

(21) Appl. No.: 15/272,025

(22) Filed: Sep. 21, 2016

(65) Prior Publication Data
US 2017/0185902 A1    Jun. 29, 2017

(30) Foreign Application Priority Data
Dec. 29, 2015    (IN) .......................... 4928/MUM/2015

(51) Int. Cl.
*G06K 9/62*    (2006.01)
*G06N 5/02*    (2006.01)
(Continued)

(52) U.S. Cl.
CPC ............. *G06N 5/022* (2013.01); *G06N 20/00* (2019.01); *G06Q 10/04* (2013.01); *G05B 23/024* (2013.01);
(Continued)

(58) Field of Classification Search
CPC ......... G06N 5/022; G06N 20/00; G06Q 10/04
See application file for complete search history.

(56) References Cited

U.S. PATENT DOCUMENTS

| 7,107,187 B1 * | 9/2006 | Saghier | ................. G06Q 10/06 |
| | | | 702/186 |
| 7,318,051 B2 * | 1/2008 | Weston | ................ G06K 9/6215 |
| | | | 706/12 |

(Continued)

FOREIGN PATENT DOCUMENTS

CN    103197983 A    7/2013

OTHER PUBLICATIONS

Powers, Rob, Moises Goldszmidt, and Ira Cohen. "Short Term Performance Forecasting in Enterprise Systems." In Proceeding of the Eleventh ACM SIGKDD International Conference on Knowledge Discovery in Data Mining—KDD '05, 801. Chicago, Illinois, USA: ACM Press, 2005. (Year: 2005).*

*Primary Examiner* — Kamran Afshar
*Assistant Examiner* — Bahram Yousefi
(74) *Attorney, Agent, or Firm* — Finnegan, Henderson, Farabow, Garrett & Dunner LLP (57) ABSTRACT

System and method for predicting enterprise system response time is disclosed. System pre-processes causal variables of historical output time series data to select subset of causal variables by applying regression techniques to obtain significant causal variables. Historical output time series data shows response time of enterprise system. System derives dummy variables from historical output time
(Continued)

series data using threshold based method. Dummy variables are specific to peak detection and trough detection in historic output time series data. System trains predictive model using historical output time series data, significant causal variables, and dummy variables to generate trained predictive model and predictive model designed using machine learning technique selected based on forecast methodology used for forecasting input time series data. System predicts enterprise system response time by using trained predictive model, input time series data or lag between input time series data and historical output time series data.

20 Claims, 7 Drawing Sheets (51) Int. Cl.
    *G05B 23/02*    (2006.01)
    *G06N 20/00*    (2019.01)
    *G06Q 10/04*    (2012.01)
    *G06N 99/00*    (2019.01)
(52) U.S. Cl.
    CPC .............. *G05B 23/0221* (2013.01); *G05B 2219/37514* (2013.01); *G06K 9/6247* (2013.01)

(56) References Cited

U.S. PATENT DOCUMENTS

| | | | | |
|---|---|---|---|---|
| 7,353,215 | B2 * | 4/2008 | Bartlett | G06K 9/6215 706/46 |
| 7,624,074 | B2 * | 11/2009 | Weston | G06N 20/00 706/1 |
| 7,693,608 | B2 * | 4/2010 | Nasle | G05B 17/02 323/212 |
| 7,756,799 | B2 * | 7/2010 | Kirshenbaum | G06K 9/6292 706/20 |
| 7,831,527 | B2 * | 11/2010 | Gates | G06N 20/00 706/12 |
| 8,015,276 | B2 | 9/2011 | Hoeflin et al. | |
| 8,019,702 | B1 | 9/2011 | Gargi et al. | |
| 8,190,537 | B1 * | 5/2012 | Singh | G06N 20/00 706/12 |
| 8,315,954 | B2 * | 11/2012 | Kobayashi | G06K 9/6282 706/12 |
| 8,386,401 | B2 * | 2/2013 | Virkar | G06N 20/00 706/12 |
| 9,189,750 | B1 * | 11/2015 | Narsky | G06N 20/00 |
| 2007/0067678 | A1 * | 3/2007 | Hosek | G05B 23/0235 714/25 |
| 2008/0168356 | A1 * | 7/2008 | Eryurek | G05B 23/0272 715/736 |
| 2014/0200869 | A1 | 7/2014 | Hampapur et al. | |

* cited by examiner

SYSTEM AND METHOD FOR PREDICTING RESPONSE TIME OF AN ENTERPRISE SYSTEM

PRIORITY CLAIM

This U.S. patent application claims priority under 35 U.S.C. § 119 to: India Application No. 4928/MUM/2015, filed on Dec. 29, 2015. The entire contents of the aforementioned application are incorporated herein by reference.

TECHNICAL FIELD

The present subject matter described herein, in general, relates to predictive analytics, and more particularly to predicting enterprise system response time using causal forecasting models.

BACKGROUND

An enterprise system is a large-scale system of integrated applications that helps organization to manage business functions, and automate many back office functions. The enterprise system integrates all facets of an operation, including products planning, development, manufacturing, sales and marketing, and thus acts as a backbone for the enterprise. Unplanned downtimes of the enterprise system due to unforeseen failures in hardware or software are extremely costly to the organization. The source of unplanned downtime can be in any of layers that make up the complete software and hardware environment, and it is hard to trace the source due to large size of the enterprise system and large scale of usage of the enterprise system. For the same reason, it is very hard to build physics based dynamical system models that can analyze enterprise system performance.

Massive or large data sets are generated in today's information-centric world by ubiquitous communication, imaging systems, mobile devices, surveillance cameras and drones, medical and e-commerce platforms, social networking sites. These large data sets need to be processed appropriately to provide timely insights, improved decision quality, risk mitigation of unplanned events, and appropriate planning of enterprise operations. These large data sets are processed by large size enterprise systems. An average dialog response time (referred to as 'response time' of the enterprise system hereafter) is an important indicator of a health of the enterprise system, and is affected by many factors associated with an operating system, or databases or application servers. Predicting well in advance, a potential failure of the large enterprise system is extremely important, so that timely interventions can be actuated to prevent performance degradation. Generally the system response time is used as a measure for system performance, and the factors affecting the system response time are identified and concurrently measured.

There are some solutions provided in the art to predict performance of the enterprise system, however these solutions are more theoretical in nature and lack in practical use case. Further, the conventional prediction of enterprise system performance is not considering complexity of the data and hence not useful for real-time decision making. Hence, existing solutions including sophisticated techniques, cannot be directly adapted to predict enterprise system response time accurately. In view of complexity of the large enterprise systems, only periodic and concurrent measurements of the response time (output) of the enterprise system, and associated input factors can be carried out. The advanced prediction of the response time can be used to design appropriate predictive maintenance schedules of the enterprise system to take preventive actions against enterprise system outages. The conventional techniques fail to predict the response time in advance accurately.

SUMMARY

This summary is provided to introduce aspects related to systems and methods for predicting response time of an enterprise system, and the concepts are further described below in the detailed description. This summary is not intended to identify essential features of subject matter nor is it intended for use in determining or limiting the scope of the subject matter.

In one implementation, a method for predicting response time of an enterprise system is disclosed. The method comprising pre-processing, by a processor, a plurality of causal variables of an historical output time series data. The plurality of causal variables affect the response time of the enterprise system. The plurality of causal variables are pre-processed to select a subset of the plurality of causal variables by applying one or more regression techniques to obtain significant causal variables. The historical output time series data shows the response time of the enterprise system. The method further comprises deriving, by the processor, a plurality of dummy variables from the historical output time series data, by using a threshold value based method. The plurality of dummy variables are specific to at least one of a peak detection and a trough detection in the output time series data. The method further comprises training, by the processor, at least one predictive model using 1) the historical output time series data, 2) the plurality of significant causal variables, and 3) the plurality of dummy variables to generate at least one trained predictive model. The at least one predictive model is designed using at least one machine learning technique. The at least one machine learning technique may be selected based on a type of forecast methodology used for forecasting input time series data. The method further comprises predicting, by the processor, the response time of the enterprise system by using the at least one trained predictive model and input time series data or a lag between the input time series data and the historical output time series data.

In one implementation, a system for predicting a response time of an enterprise system is disclosed. The system comprises a processor and a memory coupled to the processor, wherein the processor executes a plurality of modules stored in the memory. The plurality of modules comprises a pre-processing module, a variable generating module and a prediction module. The pre-processing module pre-processes a plurality of causal variables of historical output time series data to select a subset of the plurality of causal variables affecting the response time of the enterprise system by applying one or more regression techniques to obtain significant causal variables. The historic output time series data shows the response time of the enterprise system. The variable generating module derives a plurality of dummy variables from the historical output time series data by using a threshold based method. The plurality of dummy variables are specific to at least one of a peak detection and/or a trough detection in the output time series data. The prediction module trains at least one predictive model using 1) the historical output time series data, 2) the plurality of significant causal variables, and 3) the plurality of dummy variables to generate at least one trained predictive model.

The at least one predictive model is designed using at least one machine learning technique. The at least one machine learning technique is selected based on a type of forecast methodology used for forecasting input time series data. The prediction module further predicts the response time of the enterprise system by using the at least one trained predictive model and input time series data or a lag between the input time series data and the historical output time series data.

In one implementation, a non-transitory computer readable medium embodying a program executable in a computing device for predicting response time of an enterprise system is disclosed. The program comprises a program code for pre-processing, a plurality of causal variables of historical output time series data, affecting the response time of the enterprise system, to select a subset of the plurality of causal variables by applying one or more regression techniques to obtain significant causal variables. The historical output time series data shows the response time of the enterprise system. The program further comprises a program code for the historical output time series data to add one or more missing values in the historical output time series data. The program further comprises a program code for deriving, a plurality of dummy variables from the historical output time series data, by using a threshold value based method. The plurality of dummy variables are specific to at least one of a peak detection and/or a trough detection in the historical output time series data. The program further comprises a program code for training at least one predictive model using 1) the historical output time series data, 2) the plurality of significant causal variables, and 3) the plurality of dummy variables to generate at least one trained predictive model, wherein the at least one predictive model is designed using at least one machine learning technique, and wherein the at least one machine learning technique is selected based on a type of forecast methodology used for forecasting input time series data. The program further comprises a program code for predicting, the response time of the enterprise system by using the at least one trained predictive model and an input time series data or a lag between the input time series data and the historical output time series data.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Systems and methods for predicting a response time of an enterprise system is disclosed. More particularly, the present disclosure discusses a system and method for implementing a variety of techniques to predict the response time of the enterprise system. The method receives historical output time series data showing response time of the enterprise system and a plurality of causal variables (may be >50) of the historical output time series data that are affecting the response time of the enterprise system, as an input. Further, the plurality of causal variables are pre-processed to select a subset of the plurality of causal variables by applying one or more regression techniques to obtain significant causal variables. The historical output time series data is also pre-processed to derive a plurality of dummy variables from the historical output time series data by using a threshold value based method. The plurality of dummy variables may be specific to at least one of a peak detection and/or a trough detection in the output time series data. Further, at least one of predictive models is trained using the historic time series data, the plurality of significant causal variables, and the plurality of dummy variables.

After training the at least one of predictive models, a response time of the enterprise system is predicted by using at least one of trained predictive models designed using at least one machine learning technique. The at least one machine learning techniques may be selected based on a type of forecast methodology used for forecasting input time series data. Data-driven and machine learning techniques are adapted to glean functional relationship between variables of the historical output time series data and the input time series data to devise a functional map in a parameterized form that can model non-stationary relationships that are time dependent. The time dependent parametric from is learnt from the historical output time series data and the input time series data. Advanced prediction of the response time of the enterprise system obtained from the functional map can be used to design appropriate predictive maintenance schedules to take preventive actions against outages of the enterprise system.

The present disclosure describes a comprehensive methodology that includes techniques to treat missing values in the historical output time series data and the input time series data, identification of new features that is dummy variables in the historical output time series data and the input time series data for improved prediction accuracy, and design of predictive models that explain functional relationship between the historical output time series data and multiple individual input time series of influential factors. The predictive models forecasts uncontrolled input factors for at least for next 24 hours' time period.

The predictive models are specially designed to focus on accuracy at critical thresholds beyond which the enterprise system performance is likely to degrade. The response time values of the enterprise system beyond the critical threshold are termed as 'peaks' (or high values). Further, accurate prediction of the peaks is important for administering alerts to take precautionary measures. In one example, the machine learning techniques such as (i) Weighted Least Squares Linear Regression (LR) (ii) Support Vector Regression (SVR) and (iii) Artificial Neural Networks (ANN) may be used to build predictive models for predicting the response time by including the dummy variable in addition to the plurality of causal variables. Given the complexity of the input time series data with a large dynamic range, the predictive models are appropriately designed to predict the 'troughs' (or low values of response times) also with good accuracy to keep an overall prediction error low. In addition, the present system and method is also capable of predicting an output of the enterprise system for 24 hours in advance by forecasting the inputs using different methods like Modified Naive, Mean & Mode, and SVR. The present disclosure presents a basket of technical solutions from which the appropriate predictive model may be chosen using a recommendation methodology depending upon a service on demand.

While aspects of described system and method for predicting the response time of the enterprise system may be implemented in any number of different computing systems, environments, and/or configurations, the embodiments are described in the context of the following exemplary system.

Figure 1:
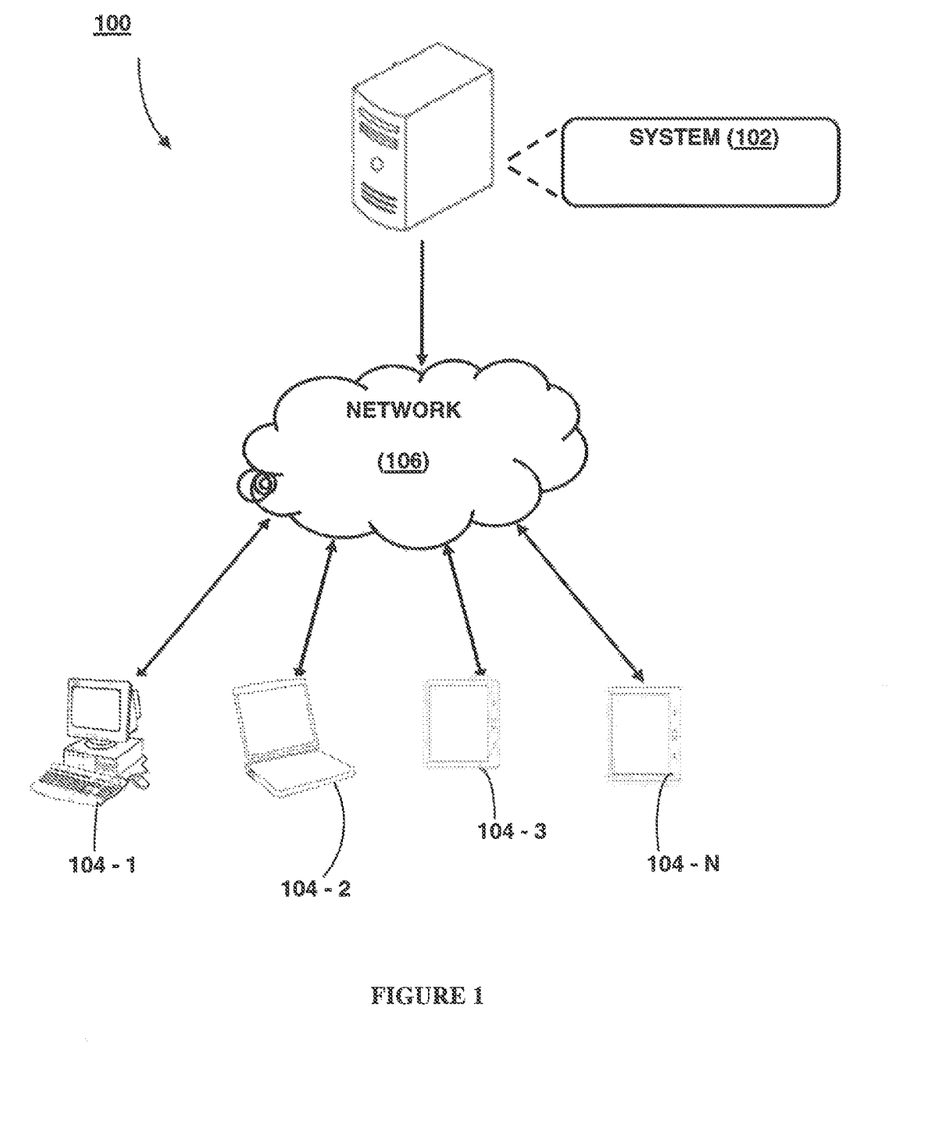
FIG. 1 illustrates a network implementation of a system for predicting response time of an enterprise system, in accordance with an embodiment of the present subject matter.

Referring to FIG. 1, a network implementation 100 of a system 102 for predicting the response time of the enterprise system is illustrated, in accordance with an embodiment of the present subject matter. Although the present subject matter is explained considering that the system 102 is implemented as a computing system, it may be understood that the system 102 may also be implemented as a variety of computing systems, such as a laptop computer, a desktop computer, a notebook, a workstation, a mainframe computer, a server, a network server, a tablet, a mobile phone, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
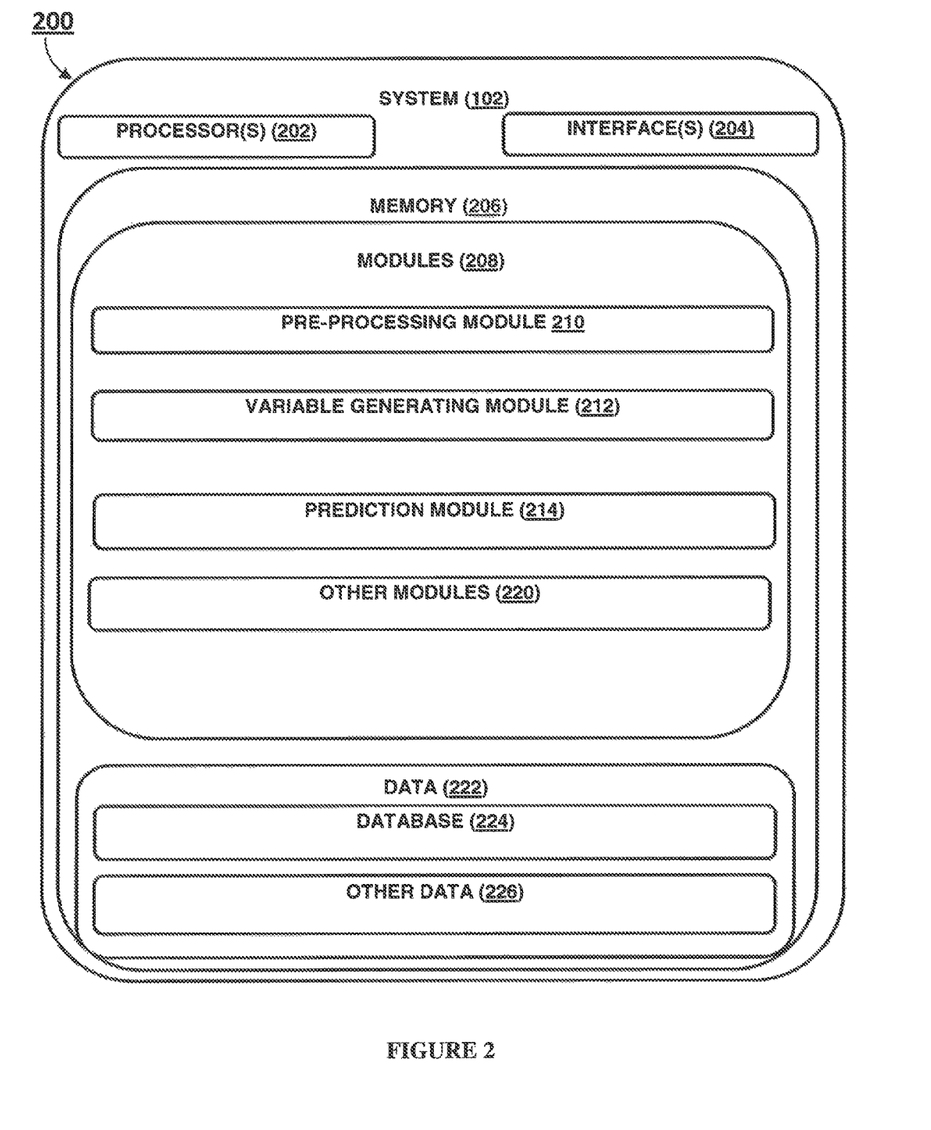
FIG. 2 illustrates the system for predicting response time of an enterprise system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 and data 222.

The modules 208 include routines, programs, programmed instructions, objects, components, data structures, etc., which perform particular tasks or implement particular abstract data types. In one implementation, the modules 208 may include a pre-processing module 210, a variable generating module 212, a prediction module 214, and other modules 220. The other modules 220 may include programs or coded instructions that supplement applications and functions of the system 102.

The data 222, amongst other things, serves as a repository for storing data processed, received, and generated by one or more of the modules 208. The data 222 may also include rules and exception database 224, and other data 226.

Figure 3:
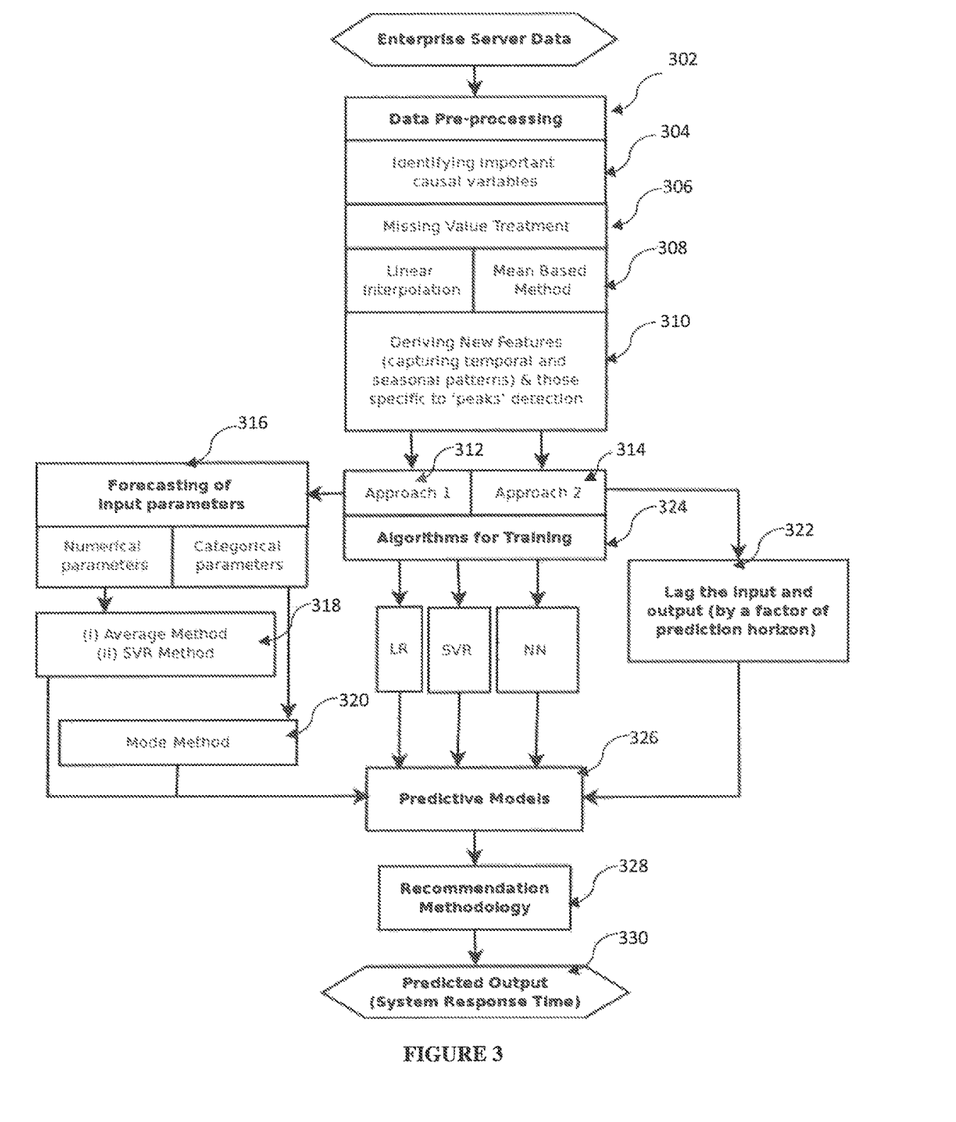
FIG. 3 illustrates a workflow of a system for predicting response time of an enterprise system, in accordance with an embodiment of the present subject matter.

Referring now to FIG. 2 and FIG. 3, working of the system 102 for predicting response time of an enterprise system 102 is explained in accordance with an embodiment of the present subject matter. The present disclosure relates to prediction of the response time of the enterprise system by using non stationary function approximation. More particularly, the response time of the enterprise system is predicted by learning a relationship between the response time and factors (causal variables) affecting the response time. Data driven models are developed to learn the relationship between the response time and the factors (causal variables) affecting the response time.

In one exemplary embodiment, a large scale production order system of an enterprise is taken as an exemplary enterprise system. Multiple types of jobs are generated by users with processing requests through the large scale production order system. Some salient operational features of the enterprise system are highlighted. Responsiveness of the enterprise system at any time is dependent on types of jobs and operational workload at any time. The responsiveness of the enterprise system can degrade depending on various factors, eventually heading to failure of the enterprise system if unattended. Three important system failure modes may be identified such as 1) Users are able to login but business process is at halt, 2) Users are able to login but system response is slow, and 3) Users are unable to login. An important common metric, or a key performance indicator (KPI), for the above three modes of failure is a dialog (on-line transaction) response time which is an elapsed time between initiation of dialog dispatch to completion of the dialog. The dialog response time is dependent on various factors associated with the Operating System, Database, and Application Servers. Sample factors (input factors/causal variables) responsible for deciding the dialog response time are listed in Table 1 below. In one example, approximately 50 input factors (causal variables) are identified and values of the input factors and the dialog response for different requests are measured at hourly intervals. Time series of average values or of appropriate statistics such as maximum delay faced by a job of the input factors (causal variables) are collected for analysis.

TABLE 1

List of Input Factors (Causal Variables)

| Sr. No | Input Factors (Causal Variables) | Description |
|---|---|---|
| 1 | X5 | No. of Application Servers |
| 2 | X10 | No. of Dialog Steps |
| 3 | X21 | No. of ABAP Dumps |
| 4 | X25 | No. of Instant Dialog Steps |
| 5 | X27 | Transactional Remote Function Call Failures |
| 6 | X30 | Extended Memory Utilization |
| 7 | X31 | Private Memory |
| 8 | X34 | Logged ON User Count |
| 9 | X37 | Roll Area |
| 10 | X38 | Page Area |
| 11 | X41 | Memory Usage |
| 12 | X42 | Swap Usage |
| 13 | X44 % | File |
| 14 | X5 | No. of Application Server |
| 15 | X10 | No. of Dialog Steps |

In one example, the enterprise system is considered to work under normal operational conditions if an average response time is below 1000 milliseconds (or is), and to enter a warning zone if the average falls between 1500 to 2200 milliseconds. The enterprise system with the response time crossing a warning zone is likely to head towards failure or an outage. Since downtimes of the enterprise system could be prohibitively costly for an organization, advanced prediction of potential failures can help in timely actuation of failure preventive interventions. The present disclosure discloses a causal-factor based response prediction model for identifying right interventions. Various time dependent function approximations on data are devised and input-output relationships are modelled. A system 102 is disclosed for predicting the response time of the enterprise system. The system executes a method comprising a set of tasks including data preprocessing, dimensionality reduction, new features creation, designing predictive models, forecasting of inputs and predicting the output by developing a prediction model. FIG. 3 illustrates a workflow of the system 102 for predicting the response time of the enterprise system.

In one embodiment, referring to FIG. 2 and FIG. 3, the pre-processing module 210 may receive historical output time series data. Referring to FIG. 3, at block 302, enterprise server data comprising the historical output time series data may be received by the pre-processing module 210. The historic output time series data may show the response time of the enterprise system. The historical output time series data may be a multivariate time series data of the enterprise system. The historical output time series data may be indexed by 't' with independent variables (input) labeled as $X_i(t)$ and the dependent variable (output) labeled as Y(t). 'i' may take values from 1 to n with 'n' being the total number of independent variables that affect the response time Y(t). The historical output time series data may be measured at predefined sampling intervals. In another example, the historical output time series data may be computed using an aggregation scheme for long intervals. Further the pre-processing module 210 may receive a plurality of causal variables of the historical output time series data. The plurality of causal variables of historical output time series data may affect the response time of the enterprise system. The plurality of causal variables may be measured simultaneously with respect to a time measurement frame of the historical output time series. In one example, the pre-processing module 210 may receive the historical output time series data and the plurality of causal variables from an enterprise server data.

Referring to block 304, after receiving the plurality of causal variables and the historical output time series data, the pre-processing module 210 may pre-process the plurality of causal variables to select a subset of the plurality of causal variables. The subset of the plurality of causal variables may be selected by applying one or more regression techniques on the plurality of causal variables to obtain significant causal variables. Applying the one or more regression techniques may comprise selecting the subset of the plurality of causal variables by evaluating a temporal relationship in the form of cross-correlation function after removing auto-correlation component repeated among the plurality of causal variables.

According to an exemplary embodiment, selecting the significant causal variables from the plurality of causal variables is also termed as 'dimensionality reduction'. Dimensionality Reduction is described here. As the historical output time series data given as input to the system 102 (pre-processing module 210) is large in size, reduction in dimensional space of the historical output time series data is required to work in a reduced dimensional space and thus to develop a parsimonious model. A stepwise linear regression technique is employed by ignoring the temporal relationship among the plurality of causal variables given as input. It is observed that majority of the causal variables have exactly similar temporal pattern as that of the response variable, supporting the use of such regression (under the first-cut assumption of linear relationship). Referring to FIG. 3, a stepwise regression starts off by choosing a regression equation containing a single significant causal variable and then attempts to build up with subsequent additions of significant causal variables one at a time as long as the additions of the significant causal variables are worthwhile. In one example, partial F-test is used to determine an order of addition of the significant causal variables. After iterative executions, a number of significant causal variables has been reduced (obtained) from 50 to 13.

The historical output time series data given as an input to the preprocessing module 210 may have many incomplete values with a sizable portion of the values missing due to possible disparate origins. Referring to block 306, the pre-processing module 210 may pre-process the historical output time series data to add one or more missing values in the historical output time series data. The one or more missing values may be added in the historical output time series data using at least one of a linear interpolation method, a mean based method or a linear regression method on the input time series data. The one or more missing values may be added to the historical output time series data at one or more historical time instants depending on an enterprise system state at that instant, or at one or more previous instants, or at subsequent instants of the historical output time series data. The one or more missing values may be added to the historical output time series data, at a historical time instant based on time of the historical time instant, and based on the enterprise system state at one or more previous or subsequent instances of the historical output time series data. The one or more missing values may be added to the historical output time series data to achieve smoothness in the historical output time series data. The enterprise system state may be represented by values of the input and historical output time series data. Causal variables (as described in above paragraph 0030 and Table 1) are extracted using pre-processing module 210 periodically to build a time series of causal variables. Missing values in each originally extracted input variable (plurality of causal variables) and response variables under study are imputed based on one or more methods. Referring to block 308 of FIG. 3, the one or more methods may comprise (i) Linear interpolation and (ii) Mean-based method. In the linear interpolation method, value of a missing value at t is a linear interpolation of the latest value available at a time earlier than t and the earliest value available at a time later than t. In Mean-based method, the missing value at time t is an average of values corresponding to same-day, same-time of all previous weeks. For example, for the output variable Y (t), $$Y_{miss}(t)=\text{average}(Y[t-(7\times1\times24)], \ldots, Y[t-(7\times2\times24)] \ldots, Y[t-(7\times N\times24)]) \quad \text{Equation (1)}$$

Wherein in Equation (1), N is a natural number satisfying $t-(7\times N\times24)>0$ Referring to block 310 of FIG. 3, after pre-processing the historical output time series data, the variable generating module 214 may derive a plurality of dummy variables (new features) from the historical output time series data. The variable generating module 214 may derive the plurality of dummy variables from the historical output time series data by using a threshold value based method. The plurality of dummy variables may be derived from the historical output time series data to assist a prediction model in (i) predicting 'peaks' in the response time with high accuracy; (ii) predicting 'troughs' with good accuracy and (iii) capturing the temporal/seasonal patterns in an output time series data. Due to rare occurrence of 'peaks' and 'troughs' in the output time series data, a threshold based method may be used to derive the plurality of dummy variables and the plurality of dummy variables may be further used to train the predictive models. The threshold values may be computed automatically by studying the historical output time series data. The dummy variables may also be termed as 'new input features'. The plurality of dummy variables may be specific to a peak detection or a trough detection in the historical output time series data. The plurality of dummy variables may be specific to both the peak detection and the trough detection in the historical output time series data. The threshold values may be either preset values, based on historical knowledge on peak or trough values that occurred in the past, or design specifications of System described in [102] or values set based on peaks and troughs observed until current time in the ongoing response variable time series. The plurality of dummy variables may be selected based on capturing temporal and seasonal patterns in the historical output time series data. The plurality of dummy variables assist in capturing the temporal and seasonal patterns in the historical output time series data while predicting the response time of the enterprise system.

According to an exemplary embodiment, the threshold based method is described here. The threshold based method may comprise automatic computation of one or more thresholds. A first threshold and a second threshold from the one or more thresholds correspond to a first set of values of Y(t), and a third threshold and a fourth threshold from the one or more thresholds correspond to a second set of values of Y(t). The first threshold, the second threshold, the third threshold and the fourth threshold are calculated after removing outliers from Y (t). Computation of the outliers is based on multiple of standard deviation on either side of the mean value of Y(t) until t. Forecasting of the time of occurrence of the thresholds is based on mode of the dummy variable values at the corresponding time instants in the historical output time series data.

Out of the four thresholds, two thresholds H1 and H2 to cater for high values and two thresholds L1 and L2 for low values of Y (t). The four thresholds values are calculated after removing outliers from Y (t). The outlier computation is based on one sample standard deviation on either side. A new sample mean and sample standard deviation are computed from Y (t) after the removal of the outliers. Then, the threshold values are set at one and two sample standard deviations on either side of the new sample mean (obtained after outlier removal) as shown in below mentioned equations 2 to 5.

$$H1=\text{sample mean}+2*(\text{sample Std dev.}) \quad \text{Equation (2)}$$

$$H2=\text{sample mean}+\text{sample Std dev.} \quad \text{Equation (3)}$$

$$L1=\text{sample mean}-2*(\text{sample Std dev.}) \quad \text{Equation (4)}$$

$$L2=\text{sample mean}-\text{sample Std dev.} \quad \text{Equation (5)}$$

It is important to note that the thresholds are adaptive in nature and vary with time, and hence with sample size used for training. Occurrence hours of the four threshold's values in training data define dummy variables (new feature vectors) which are later assigned weights appropriately from improved peak or trough prediction accuracy. As the sample size increases, the four threshold values vary, and hence, the associated variables described below also evolve with time building a non-stationary approximation. Formally the dummy variables $X_{d1}$, are constructed as follows. $X_{d1}$ is derived by extracting time instants t from the historical output time series data at which the response time of the enterprise system Y (t)>H1.

$$Xd1(t)=1, \text{ for all } t \text{ such that } Y(t)>H1 \text{ or } 0, \text{ otherwise} \quad (6)$$

$X_{d2}$ is derived by extracting the time instants t from the historical output time series data at which system response time H2<Y (t)≤H1.

$$X_{d2}(t)=1, \text{ for all } t \text{ such that } H2<Y(t)<=H1 \text{ or } 0, \text{ otherwise} \quad \text{Equation (7)}$$

The dummy variables $X_{d1}$ and $X_{d2}$ (two vectors) define the 'peaks' in the response time. $X_{d3}$ is derived by extracting the time instants t from the historical output time series data at which the response time Y (t)≤L1.

$$X_{d3}(t)=1, \text{ for all } t \text{ such that } Y(t)<=L1, 0, \text{ otherwise} \quad \text{Equation (8)}$$

$X_{d4}$ is derived by extracting the time instants t from the historical output time series data at which the response time L1<Y (t)≤L2.

$X_{d4}(t)=1$, for all $t$ such that $L1<=Y(t)<=L2$, 0, otherwise  Equation (9)

The dummy variables $X_{d3}$ and $X_{d4}$ (two vectors) define the 'troughs' in the response time. $X_{d5}$ is derived based on historical data by applying higher weights to time instants in the past where system response time is identified as 'peaks' or 'troughs' by the above four dummy variables (four feature vectors) and $X_{d5}$ is represented as:

$X_{d5}(t)=10$, for all $t$ such that $X_{d1}$ or $X_{d2}$ or $X_{d3}$ or $X_{d4}=1$, 0, otherwise  Equation (10)

In one example, in addition to the above 23 dummy variables based on time in hours (2 to 24) and 6 based on day of the week (Saturday to Thursday) may also be included. The addition dummy variables are supported by the strong correlation in temporal patterns. In the case of neural network model, temporal features like previous-day same-time output (response time of enterprise system) and previous week same-day same-time output, maximum of last three weeks same-day same-time output are used to capture the temporal and seasonal variations in the historical output time series data. Three dummy variables $X_{d6}$, $X_{d7}$, and $X_{d8}$ (new features) are derived from the temporal features like previous-day same-time output (response time) and previous week same-day same-time output, maximum of last three weeks same-day same-time output of this type and are formally represented as described below.

$X_{d6}$ is derived based on previous day same-time Y and is represented as shown in equation 11.

$X_{d6}(t)=Y(t-24)$  Equation (11)

$X_{d7}$ is derived based on previous week same-day same time Y and represented as shown in equation 12.

$X_{d7}(t)=Y(t-168))$  Equation (12)

$X_{d8}$ is derived based on the maximum of the last three weeks same-day same-time, the response time Y and represented as shown in equation 13.

$X_{d8}(t)=\max(Y(t-168);Y(t-336);Y(t-504))$  Equation (13)

The additionally derived dummy variables (new features) as described above assist in increasing the prediction accuracy of 'peaks' in the response time of the enterprise system, which is critical to system performance.

Referring to FIG. 3, at block 312, after generating the plurality of dummy variables, the prediction module 214 may generate input time series data. The prediction module 214 may generate the input time series data by forecasting the input time series data. One or more approaches may be followed to forecast the input time series data. The first approach from the one or more approaches uses a direct relationship between input X(t) and output Y (t). Here the input X(t) includes the original inputs X(t) and the derived inputs $X_{di}(t)$ as shown in equation 14.

$Y_{predicted}(t)=f(X(t))$  Equation (14)

To predict the output time series data in advance (prediction horizon at least up to 24 hours), it is required to forecast the input time series data for the same prediction horizon as that of the output time series data. Since the input time series data (vector) has both numerical values and categorical values, appropriate time-series forecasting method is used for the prediction of individual input vector of input time series data. Referring to FIG. 3 at block 318, in one of the forecasting method, to predict the numerical value of the input time series data, SVR model may be used. The SVR model predicts the individual input time series (vector) by using a combination of one day (24 hours), two days (48 hours) and one week (168 hours) lagged version of the same input time series (vector) as inputs as shown in equations 14 and 15 respectively.

Forecast for the value of a numerical input variable at any instant t is either set equal to an average of values of that variable at (t−24), (t−48) and the like, or forecast using appropriate time series model as in Equation 15. Forecast for the value of a categorical input variable at any instant t is set equal to the mode or most frequent value of that variable at (t−24), (t−48) and the like, as shown in Equation 16.

$X_{predicted\ numerical\ i}(t)\sim SVR(X_i(t-24),X_i(t-48),X_i(t-168))$  Equation (15)

Referring to FIG. 3 at block 318, another method of forecasting the input time series data is based on taking a mean of an input parameter value at the corresponding time instants is used.

$\overline{X}_{predicted\ numerical\ i}(t1_p)=1/N\Sigma_{k=1}^{N}X_{numerical\ i\ k}(t1)$  Equation (16)

Referring to FIG. 3, at block 320, to predict the categorical input values of the input time series data, mode of the input parameter value at the corresponding time instants is used.

$X_{predicted\ categorical\ i}(t1_p)=\text{mode}(X_{categorical\ i}(t1))$  Equation (17)

wherein t1 is the time instant in hours which takes values from 1 to 24.

Referring to FIG. 3 at block 314, the second approach for predicting the response time of the enterprise system, may use a modified naive method for predicting the output Y (t) using a one day (24 hours) lagged version of the inputs and output. The second approach does not require the input time series data to be forecasted. Referring to FIG. 3 at block 322, usually a lag in the time series data output is the same as the prediction horizon. Since here focus is on the prediction horizon of at least 24 hours, a lag factor is taken as 24 hours as shown in Equation 17.

$Y_{predicted}(t)\sim(X(t-24),Y(t-24))$  Equation (17)

In one embodiment of the present disclosure, referring to FIG. 3 at block 324, after generating the plurality of dummy variables, the prediction module 214 may train at least one predictive model to generate at least one trained predictive model. The prediction module 214 may train the at least one predictive model by using 1) the historical output time series data, 2) the plurality of significant causal variables, and 3) the plurality of dummy variables to generate the at least one trained predictive model. The at least one predictive model may be designed using at least one machine learning technique. The machine learning technique may be selected based on a type of forecast methodology used for forecasting the input time series data. The Input time series data is forecasted based on a type of the causal variables of the input time series data, wherein the type of the causal variables is either numerical or categorical. The machine learning technique may be selected from a Weighted Least Squares Linear Regression (WLR) technique, a Support Vector Regression (SVR) technique and an Artificial Neural Networks (ANN) technique. In another embodiment, the machine learning technique may be any machine learning technique known to a person skilled in the art.

Referring to FIG. 3 at block 326, in another embodiment, the plurality of dummy variables, the significant causal variables, the threshold values, and the at least one machine learning technique may be used to train the predictive models to forecast an output time series data. The predictive models may be designed based on a first technique comprising using a direct relationship between input variables X(t) and Output variables Y (t) of the historical output time series data. The input variables X(t) may include the input variables Xi(t) that are the significant causal variables of the output time series data and the derived inputs Xdi(t) that are the dummy variables of the output time series data. Forecasting the input time series of numerical data is based on seasonal mean of input time series value, which is the average of the input variable value at the corresponding time instants in the history. For history, all the data collected from the system backwards from the current time is considered. Forecasting the input time series of categorical data is based on the mode of the input time series values at the corresponding time instants in the history.

The predictive models may be designed based on a second technique comprising use of a modified naive method for predicting the output Y (t) using a time period lagged version of the inputs variables (causal variables) along with lagged output variables. Three different predictive models may be trained for both the approaches by applying historical data to form a basket of solutions for the prediction of system response time of the enterprise.

In one embodiment, a Weighted Least Squares Linear Regression technique may be used to train the at least one predictive model. A linear model given below is optimized for weighted error described below. The observations in the historical output time series data that exceeded the thresholds are assigned weights differentially based on the criticality of the threshold for use in weighted least squared method.

$$\overline{Y}(t+1) = \phi_1 Y^{Actual}(t) + \beta_0 + \beta_1 X_1(t) + \ldots + \beta_n X_n(t) + \gamma_1 X_{d1}(t) + \ldots + \gamma_m X_{dm}(t) \quad \text{Equation (18)}$$

Wherein in Equation (18), $X_i$ are the significant causal variables (influential factors) obtained from dimensionality reduction and $X_{di}$ are the derived input variables that is dummy variables. The coefficients $\phi_1$, $\beta_i$, and $\gamma i$ as mentioned in Equation 18 are obtained by optimizing the weighted error given below on training data. 'n' in equation 18 represents the lag and equals to 1 if the SVR based input forecasts model is used to forecast the input time series data, and equals to 24 if modified naive method is used instead.

Minimize $$\Sigma_t w_t (\overline{Y(t)} - Y_t^{Actual}(t))^2 \quad \text{Equation (19)}$$

Wherein in Equation (19), $W_t$ are the weights assigned based on the importance of observation at time t.

Support Vector Regression (SVR) technique is an extension of Support Vector Machines-based classification to real-valued functions. As in any regression technique, $\epsilon$-insensitive loss function is used to measure deviations, and the goal is to find a function fSV R(X(t)) that has at most $\epsilon$ deviation from the actual Y (t) for all training data, and at the same time as flat as possible. In presently used SVR technique, the input variables that is plurality of significant causal variables are appended with weekday, and time of the day to dummy variables to model temporal affects and hence, to model non-stationary property indirectly in the function approximation. Since the temporal variables do not have any preference connotation, the dummy variable representation allows for unbiased representation of time variables in Radial Basis Function (RBF) kernels. In one example, RBF kernels are used to estimate the regression function. Equation 20 as mentioned below indicates that the forecast for values of response variable is a function of lagged response variable, the input variables and the dummy variables. The actual function is estimated from time series data $$\overline{Y} = f_{SVR}(Y_{lag}, X_1, \ldots, X_n; X_{d1}, \ldots, X_{dm}) \quad \text{Equation (20)}$$

In another exemplary embodiment, the machine learning technique used to design the predictive model is Artificial Neural Network (ANN). One hidden-layer feed-forward network is considered with 15 hidden neurons having sigmoidal activation function. The novelty of using this technique is in arriving at the appropriate inputs for the ANN, where apart from using system inputs that is significant causal variables (Xi), historical inputs Xd6, Xd7 and Xd8 are also used. Additionally, the maximum of the response time out of the previous three weeks (on the same day) and which week day, are also fed as inputs. The ANN technique designed predictive model helps in capturing information (data) relevant to peaks. For ANN models in time series, refer equations (6) and (7).

$$\overline{Y} = f_{NN}(Y_{lag}, X_1, \ldots, X_n, X_{d6}, X_{d7}, X_{d8}) \quad \text{Equation (21)}$$

In Equation (21), Xi are the significant causal variables (influential factors) obtained from dimensionality reduction and Xdi are the derived input variables that is the dummy variables as described above. Note that for Neural Networks (NN) only the derived features $X_{d6}$; $X_{d7}$; $X_{d8}$ are used in prediction.

Figure 4:
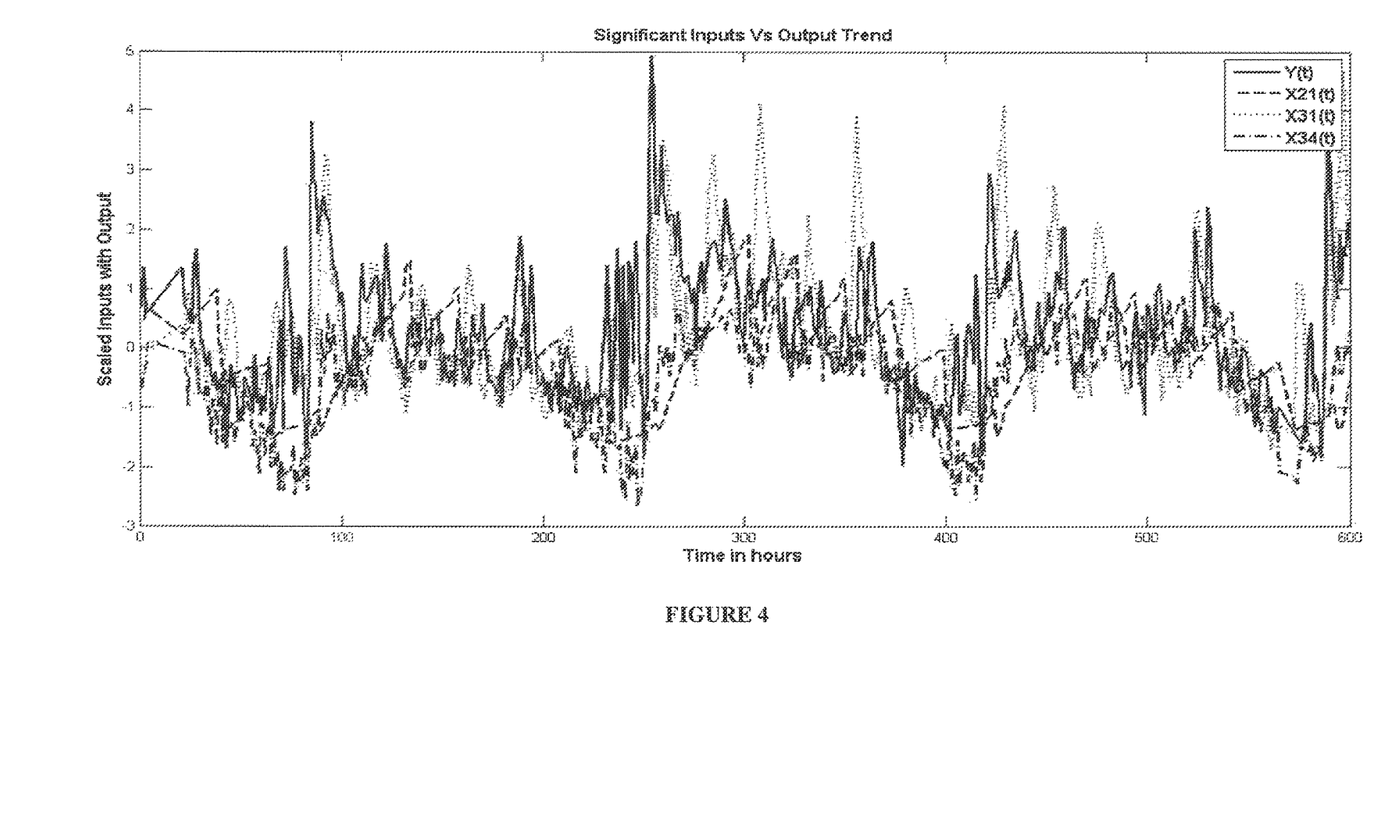
FIG. 4 illustrates three inputs ($X_{21}(t)$, $X_{31}(t)$, $X_{34}(t)$) as the significant causal variables that have a strong influence on the response time $Y(t)$ of the enterprise system, in accordance with an exemplary embodiment of the present subject matter.
Figure 5:
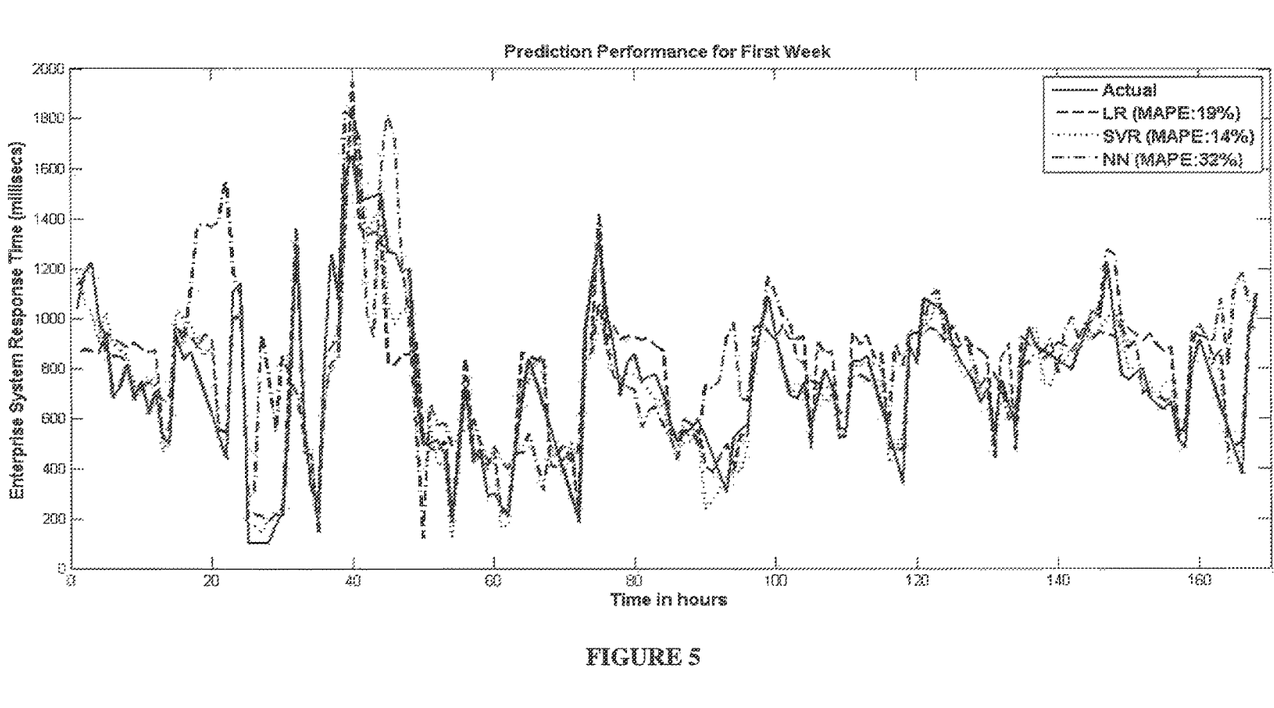
FIG. 5 show actual response time compared with predicted response time of the enterprise system using the system 102 with Average Mean Absolute Percent Error (AMAPE) values over a span of one week, in accordance with an exemplary embodiment of the present subject matter.
Figure 6:
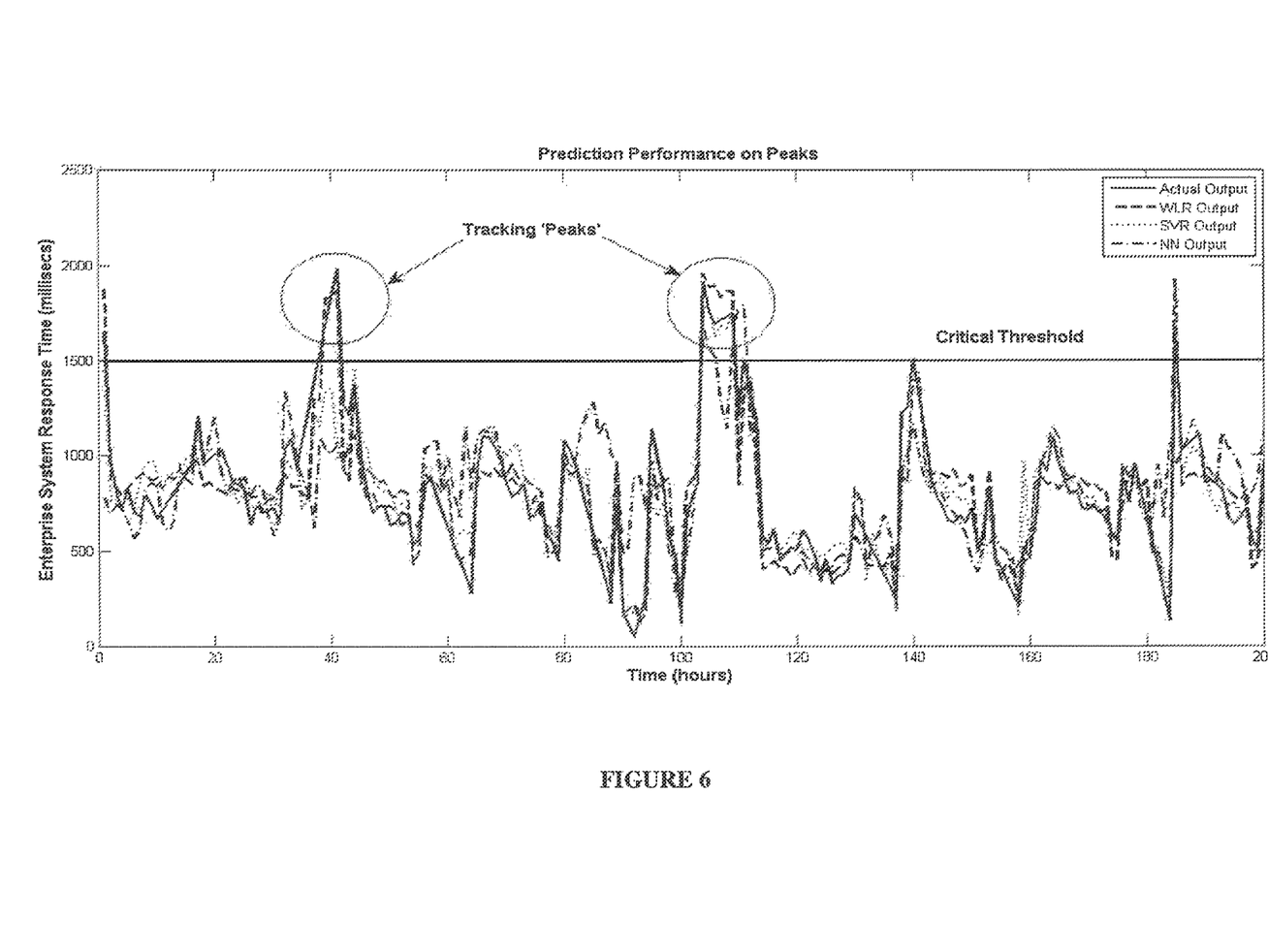
FIG. 6 shows performance of trained predictive models of the system 102 in tracking 'peaks', in accordance with an exemplary embodiment of the present subject matter.

Experimental results of implementation of system 102 are discussed herein. A prototype of the system 102 is developed to demonstrate capability of the system 102 in predicting the response time with good accuracy. The enterprise system data comprising more than 50 causal variables (influential features) $X_i$ affecting the response time Y (t) of the enterprise system. In next step dimensionality reduction is implemented by using stepwise regression to identify 13 significant causal variables out of 50 causal variables to be most significant. FIG. 4 shows three inputs ($X_{21}$(t), $X_{31}$(t), $X_{34}$(t)) as the significant causal variables that have a strong influence on the system response time, Y (t). The prediction model for $\epsilon$-SVR is tuned with parameter values of penalty cost, C=1 and loss parameter $\epsilon$=0.01 using the RBF kernel for prediction analysis. The prediction models are developed on 26 weeks of enterprise system data comprising the causal variables and the output time series data, and tested for a span of 8 weeks (56 days) using a sliding window of 1 week to arrive at a detailed performance evaluation. FIG. 5 show actual system response time with the predicted ones using the system 102 with Average Mean Absolute Percent Error (AMAPE) values over a span of one week. FIG. 6 shows performance of the trained predictive models of the system 102 in tracking 'peaks'. The 'peaks' here are defined by those values of Y (t) which go beyond the user defined 'critical threshold' (taken as 1500). Weighted linear regression (WLR) model outperforms the rest of the predictive models in tracking the 'peaks' as is observed from the plot shown in FIGS. 5 and 6.

As the AMAPE values are comparable across all the predictions models, a Percentage Error (PE) distribution across models is analyzed to understand the discriminative capability of the prediction models. Tables II to IV present results on PE distribution. Overall SVR has high concentration of low individual errors compared to other prediction models. However, it is observed that Weighted Linear Regression offers good prediction accuracy for peaks predicting with 90% of the cases having less than 20% error. Referring to FIG. 3, at block 328, based on experimental results, a recommendation methodology may be suggested to choose an appropriate predictive model or a mix of predictive model depending on a service on demand. Since the prediction methods of different prediction models have been tested thoroughly for the robustness, by examining the performance of the methods of different prediction models over 8 weeks with 24 hours rolling horizon, the discriminative performance of the different prediction models can be ascertained to be robust. For good overall accuracy, SVR based prediction model can be recommended and if the service requires good accuracy for peaks, WLR based prediction model is recommended. Referring to FIG. 3 at block 330, the response time of the enterprise system is predicted by using the at least one trained predictive model and an Input time series data or a lag between the input time series data and the historical output time series data. In one example, the predictions from all three techniques (WLR, SVR and ANN) are fused appropriately to create a mix, such as using SVR method on weekdays and WLR on weekends. Table 2 shows Enterprise system response time prediction performance of the system 102 on 24 hrs rolling horizon. Table 3 shows enterprise system's response time prediction performance of the system 102 at peaks, and Table 4 shows enterprise system response time prediction performance of the system 102 over the weekends.

TABLE 2

Response time prediction performance of the system 102 on 24 hrs rolling horizon

| Algorithm Error | <5% | <10% | <15% | <20% | <25% | <30% |
|---|---|---|---|---|---|---|
| WLR | 15% | 35% | 50% | 65% | 75% | 84% |
| SVR | 21% | 42% | 60% | 70% | 79% | 85% |
| ANN | 19% | 38% | 53% | 65% | 73% | 80% |

TABLE 3

Response time Prediction performance of the system 102 at peak

| Algorithm Error | <5% | <10% | <15% | <20% | <25% | <30% |
|---|---|---|---|---|---|---|
| WLR | 8% | 57% | 77% | 91% | 94% | 94% |
| SVR | 25% | 53% | 62% | 68% | 81% | 81% |
| ANN | 7.7% | 18% | 46% | 56% | 59% | 62% |

TABLE 4

Response time prediction performance of the system 102 over the weekends

| Algorithm Error | <5% | <10% | <15% | <20% | <25% | <30% |
|---|---|---|---|---|---|---|
| WLR | 13% | 31% | 45% | 59% | 69% | 83% |
| SVR | 17% | 37% | 53% | 62.5% | 73% | 79% |
| ANN | 11% | 25% | 37% | 47% | 55% | 61% |

Figure 7:
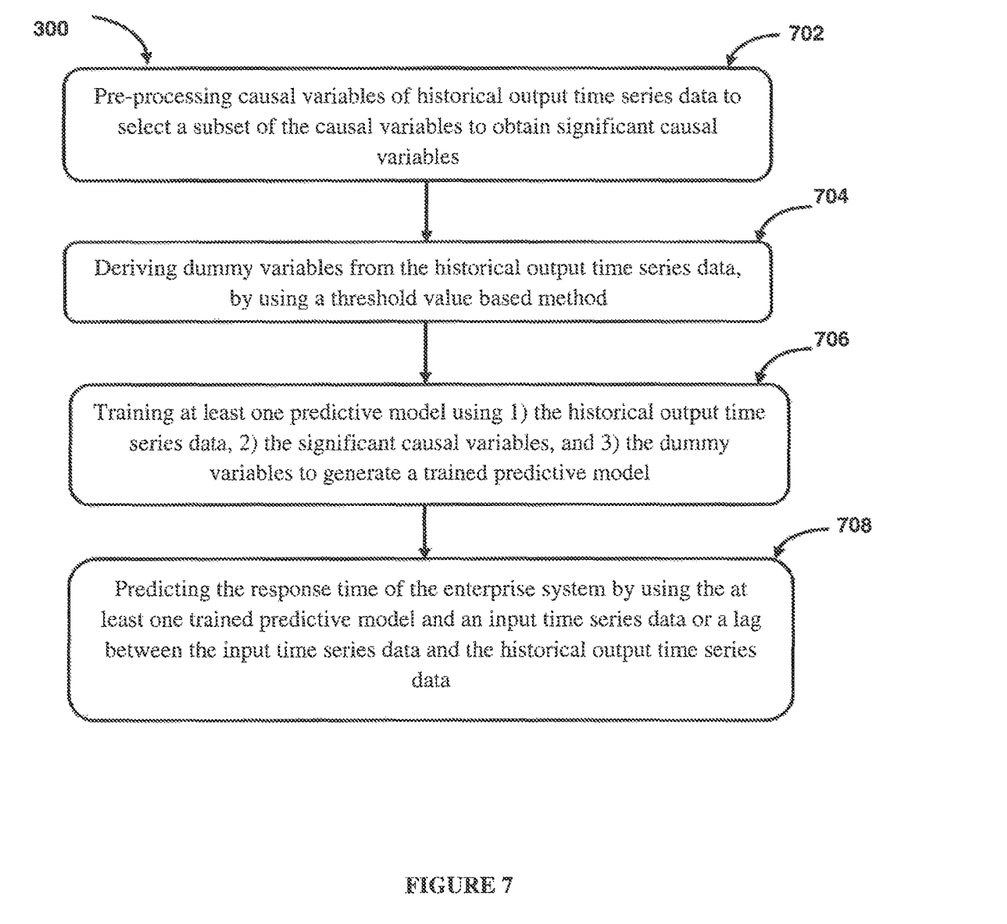
FIG. 7 illustrates a method for predicting response time of an enterprise system, in accordance with an embodiment of the present subject matter.

Referring now to FIG. 7, a method 700 for predicting response time of an enterprise system is shown, in accordance with an embodiment of the present subject matter. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions are performed by remote processing devices that are linked through a communications network. In a distributed computing environment, computer executable instructions may be located in both local and remote computer storage media, including memory storage devices. The method can be implemented in suitable hardware, software, firmware, or combination thereof. However, in present embodiments the method 700 may be considered as implemented in above mentioned system 102.

At step 702, a historical output time series data and a plurality of causal variables of the historical output time series data may be pre-processed. The historical output time series data shows the response time of the enterprise system. The historical output time series data may be measured at predefined sampling time intervals or may be computed using an aggregation scheme for long intervals. The plurality of causal variables may be measured simultaneously with respect to a time measurement frame of the historical output time series data. The historical output time series data may be a multivariate time series data of the enterprise system indexed by 't' with independent variables (input) labeled as $X_i(t)$ and the dependent variable (output) labeled as Y(t), where 'i' takes values from 1 to n with 'n' being the total number of independent variables that affect the response time Y(t).

The plurality of causal variables of the historical output time series data may affect a response time of an enterprise system. The plurality of causal variables may be preprocessed by applying one or more regression techniques to select a subset of the plurality of causal variables to obtain significant causal variables. The significant causal variables affect the response time of an enterprise system considerably. Applying the one or more regression techniques comprises selecting the subset of the plurality of causal variables by evaluating the temporal relationship among the plurality of causal variables.

The historical output time series data may also be pre-processed, at step 702, to add one or more missing values in the historical output time series data. The addition of missing values into the historical output time series data improves prediction accuracy in predicting the response time of the enterprise system by system 102. The one or more missing values may be added to the historical output time series data at one or more historical instants depending on an enterprise system state at that instant, or at one or more previous instants, or at subsequent instants in the historical output time series data.

At step 704, a plurality of dummy variables may be derived from the historical output time series data, by using a threshold value based method. The plurality of dummy variables may be specific to at least one of a peak detection and/or a trough detection in the output time series data. The threshold values may be either preset values, based on historical knowledge, or design specifications of the enterprise system, or dynamically adjusted as the output time series data evolves with time. The plurality of dummy variables may be selected based on capturing temporal and seasonal patterns in the historical output time series data, and the plurality of dummy variables may further assist in capturing temporal and seasonal patterns in the historical output time series data while predicting the response time of the enterprise system.

At step 706, at least one predictive model may be trained using 1) the historical output time series data, 2) the plurality of significant causal variables, and 3) the plurality of dummy variables to generate at least one trained predictive model. The at least one predictive model is designed using at least one machine learning technique. The at least one machine learning technique is selected based on a type of forecast methodology used for forecasting input time series data.

At step 708, the response time of the enterprise system may be predicted by using the at least one trained predictive model and input time series data or a lag between the input time series data and the historical output time series data.

What is claimed is:

1. A method for predicting response time of an enterprise system, the method comprising: pre-processing, by a processor, a plurality of causal variables of an historical output time series data, affecting a response time of an enterprise system, to select a subset of the plurality of causal variables by applying one or more regression techniques to obtain significant causal variables, wherein the historical output time series data shows the response time of the enterprise system, and deriving, by the processor, a plurality of dummy variables from the historical output time series data, by using a threshold value based method, and wherein the plurality of dummy variables are specific to at least one of a peak detection and a trough detection in the historical output time series data; and training, by the processor, at least one predictive model using the historical output time series data, the plurality of significant causal variables, and the plurality of dummy variables to generate at least one trained predictive model, wherein the at least one predictive model is designed using at least one machine learning technique; and predicting, by the processor, the response time of the enterprise system by using the at least one trained predictive model and an input time series data or a lag between the input time series data and the historical output time series data.

2. The method of claim 1, wherein the input time series data is forecasted based on a type of the causal variables of the input time series data, wherein the type of the causal variables is either numerical or categorical.

3. The method of claim 1, wherein the historical output time series data is pre-processed to add one or more missing values in the historical output time series data.

4. The method of claim 1, wherein the historical output time series data is a multivariate time series data of the enterprise system indexed by 't' with independent variables (input) labeled as $X_i$ (t) and the dependent variable (output) labeled as Y(t), where 'i' takes values from 1 to n with 'n' being the total number of independent variables that affect the response time Y(t).

5. The method of claim 1, wherein the historical output time series data is measured at predefined sampling intervals or computed using an aggregation scheme for long intervals, and the plurality of causal variables are measured simultaneously with respect to a time measurement frame of the historical output time series.

6. The method of claim 3, wherein the one or more missing values are added to the historical output time series data at one or more historical instants depending on an enterprise system state at that instant, or at one or more previous instants, or at subsequent instants in the historical output time series data.

7. The method of claim 1, wherein the threshold values are either preset, based on historical knowledge, or design specifications, or dynamically adjusted as data evolves with time.

8. The method of claim 1, wherein the plurality of dummy variables are selected based on capturing temporal and seasonal patterns in the historical output time series data, and the plurality of dummy variables further assist in capturing the temporal and seasonal patterns in the historical output time series data while predicting the response time of the enterprise system.

9. The method of claim 1, wherein applying the one or more regression techniques comprises selecting the subset of the plurality of causal variables by evaluating the temporal relationship among the plurality of causal variables.

10. The method of claim 1, wherein the plurality of dummy variables, the significant causal variables and threshold values, and the at least one machine learning technique are used to train the at least one predictive model to forecast the output time series data.

11. The method of claim 1, wherein using the threshold based method comprises automatic computation of one or more thresholds, wherein a first threshold and a second threshold from the one or more thresholds correspond to a first set of values of Y(t), and a third threshold and a fourth threshold from the one or more thresholds correspond to a second set of values of Y(t), and wherein the first threshold, second threshold, third threshold and the fourth threshold are calculated after removing outliers from Y (t), and wherein computation of the outliers is based on a multiple of the standard deviation on either side of the mean value of Y(t) until t.

12. The method of claim 1, wherein the predictive models are designed based on a first technique comprising using a direct relationship between input variables X(t) and Output variables Y (t) of the output time series data, and wherein the input variables X(t) include the original input variables Xi(t) that are the significant causal variables of the output time series data and the derived inputs Xdi(t) that are the plurality of dummy variables of the output time series data.

13. The method of claim 1, wherein forecasting the input time series of numerical data is based on a seasonal mean of the input time series data, wherein the seasonal mean is the average of the input variable values at the corresponding time instants in history.

14. The method of claim 1, wherein forecasting the input time series of categorical data is based on a mode of the input time series data at the corresponding time instants in history.

15. The method of claim 1 wherein derivation of the plurality of dummy variables is based on a mode of the plurality of dummy variables at the corresponding time instants in the history.

16. The method of claim 1, wherein the at least one predictive model is designed based on a second technique comprising use of a modified naive method for predicting the output Y (t) using a time period lagged version of the inputs variables along with a lagged output variable.

17. A system for predicting a response time of an enterprise system, the system comprising: a processor; and a memory coupled to the processor, wherein the processor executes a plurality of modules stored in the memory, and wherein the plurality of modules comprises: a pre-processing module, pre-process, a plurality of causal variables of a historical output time series data affecting a response time of an enterprise system, to select a subset of the plurality of causal variables affecting the response time of the enterprise system by applying one or more regression techniques to obtain significant causal variables, wherein the historical output time series data shows the response time of the enterprise system; and a variable generating module to, derive, a plurality of dummy variables from the historical output time series data, by using a threshold based method, and wherein the plurality of dummy variables are specific to at least one of a peak detection and a trough detection in the historical output time series data; and a prediction module to, train at least one predictive model using the historical output time series data, the plurality of significant causal variables, and the plurality of dummy variables to generate at least one trained predictive model, wherein the at least one predictive model is designed using at least one machine learning technique; and predict, the response time of the enterprise system by using the at least one trained predictive model, and an input time series data or a lag between the input time series data and the historical output time series data.

18. The system of claim 17, wherein the one or more missing values are added to the historical output time series data, at a historical time instant based on time of the historical time instant, and based on an enterprise system state at one or more previous or subsequent instances of the historical output time series data to achieve smoothness in the historical output time series data, wherein the enterprise system state is represented by values of the input and historical output time series data.

19. The system of claim 17, wherein the at least one machine learning technique is selected based on a type of forecast methodology used for forecasting input time series data.

20. A non-transitory computer readable medium embodying a program executable in a computing device for predicting response time of an enterprise system, the program comprising: a program code for pre-processing, a plurality of causal variables of an historical output time series data, affecting a response time of an enterprise system, to select a subset of the plurality of causal variables by applying one or more regression techniques to obtain significant causal variables, wherein the historical output time series data shows the response time of the enterprise system, and the historical output time series data to add one or more missing values in the historical output time series data; a program code for deriving, a plurality of dummy variables from the historical output time series data, by using a threshold value based method, and wherein the plurality of dummy variables are specific to at least one of a peak detection and a trough detection in the historical output time series data; a program code for training at least one predictive model using the historical output time series data, the plurality of significant causal variables, and the plurality of dummy variables to generate at least one trained predictive model, wherein the at least one predictive model is designed using at least one machine learning technique, and wherein the at least one machine learning technique is selected based on a type of forecast methodology used for forecasting input time series data; and a program code for predicting, the response time of the enterprise system by using the at least one trained predictive model and an input time series data, or a lag between the input time series data, and the historical output time series data.

* * * * *